(12) United States Patent
Chen et al.

(10) Patent No.: US 9,817,573 B2
(45) Date of Patent: Nov. 14, 2017

(54) SMART CARD MANAGEMENT METHOD, MEMORY STORAGE DEVICE AND MEMORY CONTROL CIRCUIT UNIT

(71) Applicant: PHISON ELECTRONICS CORP., Miaoli (TW)

(72) Inventors: Meng-Chang Chen, Miaoli County (TW); Hsing-Chang Liu, Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 113 days.

(21) Appl. No.: 14/666,319

(22) Filed: Mar. 24, 2015

(65) Prior Publication Data

US 2016/0216893 A1 Jul. 28, 2016

(30) Foreign Application Priority Data

Jan. 28, 2015 (TW) .............................. 104102838 A

(51) Int. Cl.
*G06F 12/00* (2006.01)
*G06F 13/00* (2006.01)
*G06F 13/28* (2006.01)
*G06F 3/06* (2006.01)
*G06F 12/02* (2006.01)

(52) U.S. Cl.
CPC .......... *G06F 3/0604* (2013.01); *G06F 3/0619* (2013.01); *G06F 3/0643* (2013.01); *G06F 3/0679* (2013.01); *G06F 3/0637* (2013.01); *G06F 12/02* (2013.01); *G06F 12/023* (2013.01); *G06F 12/0223* (2013.01)

(58) Field of Classification Search
CPC .... G06F 3/0637; G06F 12/02; G06F 12/0223; G06F 12/023
USPC ........................................................ 711/156
See application file for complete search history.

(56) References Cited

U.S. PATENT DOCUMENTS

2002/0199071 A1* 12/2002 Kitamura ................ H04L 63/10
                                                                 711/152
2007/0073995 A1*  3/2007 Rudelic .................. G06F 21/575
                                                                 711/202
2013/0179626 A1*  7/2013 Chang .................... G06F 3/0643
                                                                 711/103

* cited by examiner

*Primary Examiner* — Charles Rones
*Assistant Examiner* — Sidney Li
(74) *Attorney, Agent, or Firm* — JCIPRNET

(57) ABSTRACT

A smart card management method, a memory storage device, and a memory control circuit unit are provided. The method includes: receiving a first setting command corresponding to a temporary file from a host system. The temporary file is configured to access the smart card, and the first setting command includes a plurality of first setting messages. One of the first setting messages includes first setting command verification information and first location identification information. The first setting command verification information is configured to verify whether the first setting command is configured to set the temporary file, and the first location identification information is configured to find a logical unit corresponding to the first setting message including the first location identification information. The method also includes: recording a first logic range belonging to the temporary file in a look-up table according to the first setting command.

21 Claims, 10 Drawing Sheets

SMART CARD MANAGEMENT METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 104102838, filed on Jan. 28, 2015. The entirety of the above-mentioned patent application is hereby incorporated by reference herein and made a part of this specification.

BACKGROUND

1. Technology Field

The invention relates to a smart card management method. More particularly, the invention relates to a smart card management method, and the method is applicable to a memory storage device having a rewritable non-volatile memory module and a smart card and also applicable to a memory control circuit unit.

2. Description of Related Art

Users' increasing acceptance of electronic wallets and stored-value cards leads to the popularity of smart cards. A smart card is typically an integrated circuit (IC) chip which includes, for instance, a microprocessor, a card operating system, a security module, and a memory, so as to allow the holder of the smart card to perform default operations. With the ability to provide computation, encryption, bidirectional communication, and security solutions, the smart card not only stores data but also protects the data stored therein. One exemplary application of the smart card is the subscriber identification module (SIM) card employed in global-system-for-mobile-communication (GSM) cellular phones. The smart card, however, is subject to its limited storage capacity. Thus, the smart card has recently begun to be combined with a memory card of a large storage device to expand the storage capacity of the smart card.

In general, data are transmitted between a host system and the smart card through accessing a temporary file associated with the smart card. At present, the data access method proposed by Google in Android 4.4.2 edition merely allows specific user application to access data under certain categories; therefore, the user application may not be able to access (e.g., write data into) some temporary files due to insufficient permissions. In another aspect, dynamically opening temporary files in the host system may prevent said issue from arising; nevertheless, if logical addresses of one dynamic temporary file is broken or inconsecutive, the memory device may not be able to record the complete logical addresses of the dynamic temporary file.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The invention is directed to a smart card management method, a memory control circuit unit, and a memory storage device, whereby the ability to manage logical addresses of a temporary file may be enhanced.

In an exemplary embodiment of the invention, a smart card management method configured to a memory storage device having a rewritable non-volatile memory module and a smart card is provided, and the method includes: receiving a first setting command corresponding to a temporary file from a host system. Here, the temporary file is associated with the smart card, the first setting command includes a plurality of first setting messages, and one of the first setting messages includes first setting command verification information and first location identification information. The first setting command verification information is configured to verify whether the first setting command is configured to set the temporary file, and the first location identification information is configured to find a logical unit corresponding to the one of the first setting messages. The method further includes: recording a first logic range belonging to the temporary file in a look-up table according to the first setting command.

In another exemplary embodiment of the invention, a memory control circuit unit that is configured to control a memory storage device having a rewritable non-volatile memory module and a smart card is provided. The memory control circuit unit includes a host interface, a memory interface, and a memory management circuit. The host interface is configured to couple to a host system. The memory interface is configured to couple to the rewritable non-volatile memory module. The memory management circuit is coupled to the host interface and the memory interface. The memory management circuit is configured to receive a first setting command corresponding to a temporary file from the host system, wherein the temporary file is associated with the smart card, the first setting command comprises a plurality of first setting messages, and one of the first setting messages comprises first setting command verification information and first location identification information, wherein the first setting command verification information is configured to verify whether the first setting command is configured to set the temporary file, and the first location identification information is configured to find a logical unit corresponding to the one of the first setting messages. In addition, the memory management circuit is further configured to record a first logic range belonging to the temporary file in a look-up table according to the first setting command.

In still another exemplary embodiment of the invention, a memory storage device that includes a connection interface unit, a rewritable non-volatile memory module, a smart card, and a memory control circuit unit is provided. The connection interface unit is configured to couple to a host system. The memory control circuit unit is coupled to the connection interface unit, the rewritable non-volatile memory module, and the smart card. The memory control circuit unit is configured to receive a first setting command corresponding to a temporary file from the host system, wherein the temporary file is associated with the smart card, the first setting command comprises a plurality of first setting messages, and one of the first setting messages comprises first setting command verification information and first location identification information, wherein the first setting command verification information is configured to verify whether the first setting command is configured to set the temporary file, and the first location identification information is configured to find a logical unit corresponding to the one of the first setting messages. In addition, the memory control circuit unit is further configured to record a first logic range belonging to the temporary file in a look-up table according to the first setting command.

In light of the above, the setting command verification information and the ordinal position identification information are added to the setting commands of a specific temporary file, such that the logical addresses belonging to the newly opened temporary file can be correctly recorded by the memory storage device, and recording errors arising from transmitting the setting commands of the newly opened temporary file in batch may be reduced.

It should be understood, however, that this Summary may not contain all of the aspects and embodiments of the invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
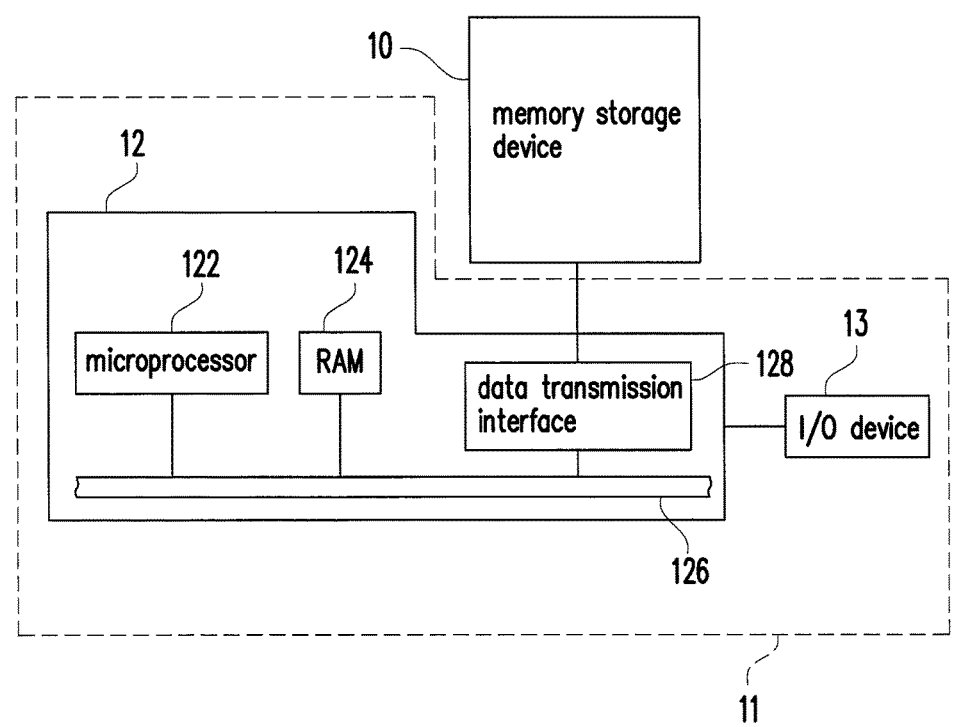
FIG. 1 is a schematic diagram illustrating a host system and a memory storage device according to an exemplary embodiment of the invention.

Reference will now be made in detail to the exemplary embodiments of the invention, examples of which are illustrated in the accompanying drawings. Wherever possible, the same reference numbers are used in the drawings and the description to refer to the same or like parts. Embodiments of the invention may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. It is to be noted that the term "a" or "an" entity refers to one or more of that entity. As such, the terms "a" (or "an"), "one or more," and "at least one" can be used interchangeably herein.

A memory storage device (also referred to as a memory storage system) typically includes a rewritable non-volatile memory module and a controller (also referred to as a control circuit). The memory storage device is usually used together with a host system, such that the host system is able to write data into or read data from the memory storage device.

Figure 2:
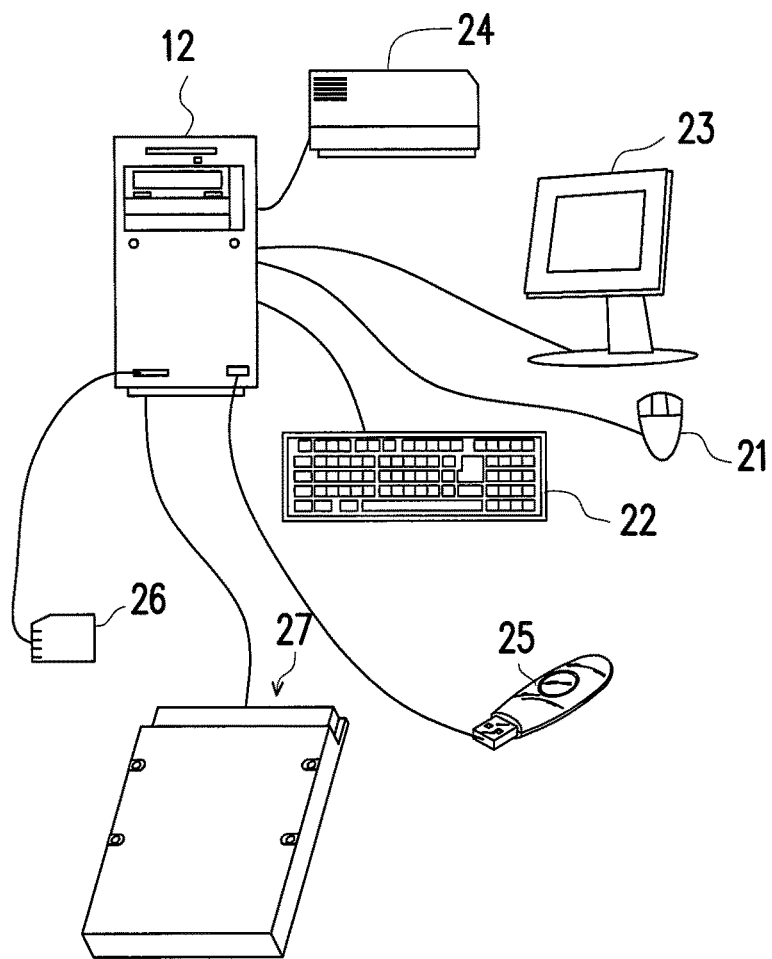
FIG. 2 is a schematic diagram exemplarily illustrating a computer, an input/output (I/O) device, and a memory storage device according to an exemplary embodiment of the invention.

FIG. 1 is a schematic diagram illustrating a host system and a memory storage device according to an exemplary embodiment of the invention. FIG. 2 is a schematic diagram exemplarily illustrating a computer, an input/output (I/O) device, and a memory storage device according to an exemplary embodiment of the invention.

With reference to FIG. 1, a host system 11 normally includes a computer 12 and an input/output (I/O) device 13. The computer 12 includes a microprocessor 122, a random access memory (RAM) 124, a system bus 126, and a data transmission interface 128. The I/O device 13 includes a mouse 21, a keyboard 22, a display 23, and a printer 24, as shown in FIG. 2. It should be understood that the devices shown in FIG. 2 should not be limited to the I/O device 13, and the I/O device 13 may further include other devices.

In the exemplary embodiment of the invention, the memory storage device 10 is electrically connected to other devices of the host system 11 through the data transmission interface 128. Through operating the microprocessor 122, the RAM 124, and the I/O device 13, data can be written into or read from the memory storage device 10. For instance, the memory storage device 10 may be a rewritable non-volatile memory storage device, e.g., a portable drive 25, a memory card 26, or a solid state drive (SSD) 27 shown in FIG. 2.

Figure 3:
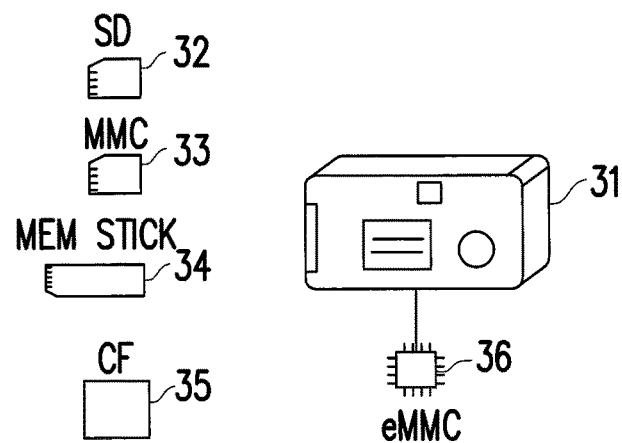
FIG. 3 is a schematic diagram illustrating a host system and a memory storage device according to an exemplary embodiment of the invention.

FIG. 3 is a schematic diagram exemplarily illustrating a host system and a memory storage device according to an exemplary embodiment of the invention.

Generally, the host system 11 may be any system that can be substantially operated together with the memory storage device 10 to store data. In the present exemplary embodiment, although the host system 11 is described as a computer system, the host system 11 in another exemplary embodiment of the invention may be a digital camera, a video camera, a communication device, an audio player, a video player, and so forth. For instance, if the host system is a digital camera (video camera, as shown in FIG. 3) 31, the rewritable non-volatile memory storage device may be a secure digital (SD) card 32, a multimedia card (MMC) card 33, a memory stick 34, a compact flash (CF) card 35, or an embedded storage device 36 as shown in FIG. 3. The embedded storage device 36 includes an embedded MMC (eMMC). It should be mentioned that the eMMC is directly electrically connected to the substrate of the host system.

Figure 4:
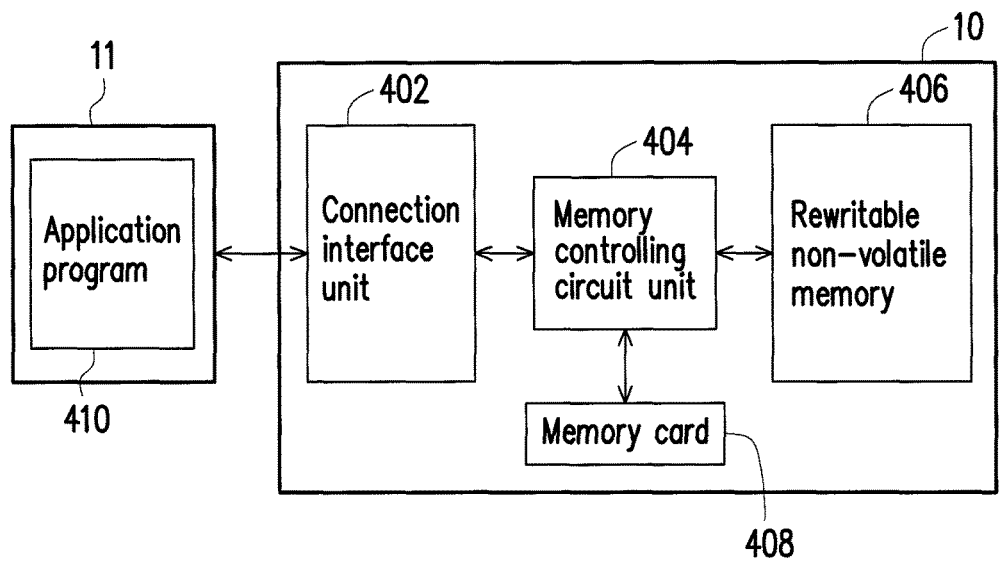
FIG. 4 is a simple block diagram illustrating the host system and the memory storage device depicted in FIG. 1.

FIG. 4 is a simple block diagram illustrating the host system and the memory storage device depicted in FIG. 1.

With reference to FIG. 4, the memory storage device 10 includes a connection interface unit 402, a memory control circuit unit 404, a rewritable non-volatile memory module 406, and a smart card 408.

In the present exemplary embodiment, the memory control circuit unit 404 is configured to operate the memory storage device 10, so as to achieve the smart card management method provided herein. Besides, it should be understood that the host system 11 is capable of performing general functions required for connecting the memory storage device 10.

The connection interface unit 402 complies with the serial advanced technology attachment (SATA) standard. However, it should be mentioned that the invention is not limited thereto, and the connection interface unit 402 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the ultra high speed-I (UHS-I) interface standard, the ultra high speed-II (UHS-II) interface standard, the MS interface standard, the MMC interface standard, the CF standard, the integrated device electronics (IDE) standard, or other suitable standards. In the present exemplary embodiment, the connection interface unit 402 and the memory control circuit unit 404 may be packaged into one chip, or the connection interface unit 402 may be arranged outside a chip having the memory control circuit unit 404.

The memory control circuit unit 404 is configured to execute a plurality of logic gates or control commands implemented in a hardware form or a firmware form and perform various data operations (e.g., data writing, reading, erasing, and merging) in the rewritable non-volatile memory module 406 and the smart card 408 according to commands issued by the host system 11.

The rewritable non-volatile memory module 406 is coupled to the memory control circuit unit 404 and configured to store data written by the host system 11. Here, the rewritable non-volatile memory module 406 may be a single-level cell (SLC) NAND flash memory module (i.e., a flash memory module capable of storing data of 1 bit in one memory cell), a multi-level cell (MLC) NAND flash memory module (i.e., a flash memory module capable of storing data of 2 bits in one memory cell), a triple-level cell (TLC) NAND flash memory module (i.e., a flash memory module capable of storing data of 3 bits in one memory cell), other flash memory modules, or other memory modules having the same characteristics.

The smart card 408 is coupled to the memory control circuit unit 404 for performing functions such as computation, encryption, bidirectional communication, security verification, etc. In an exemplary embodiment of the invention, the smart card 408 is a contact-type smart card compatible with the ISO 7816 standard. Nevertheless, it should be understood that the invention is not limited thereto, and the smart card 408 may also be other contact-type or non-contact-type smart cards compatible with the ISO 14443 standard, the ISO 15408 standard, or other smart card security standards, for instance. In addition, the smart card 408 may also be a radio frequency identification (RFID) chip, a wireless transmission chip (e.g., a Bluetooth chip), or a multimedia control chip (e.g., a digital audio recording chip), and so forth. Besides, note that the memory control circuit unit 404 and the smart card 408 may be an independent chip, respectively, or the memory control circuit unit 404 and the smart card 408 may be collectively packaged as one single chip. In the present exemplary embodiment, the smart card 408 serves to store sensitive data relevant to security verification, such as encryption/decryption keys, account numbers, and/or passwords. However, in another exemplary embodiment, the smart card 408 may also be applied to store normal data.

Figure 5:
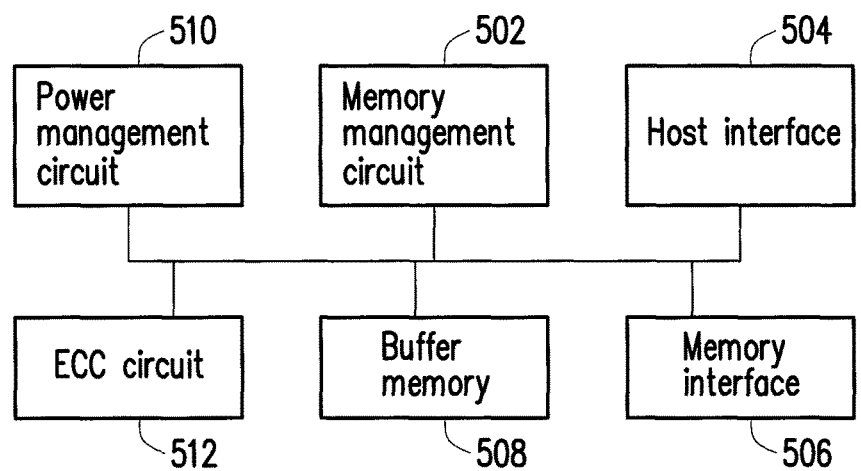
FIG. 5 is a simple block diagram illustrating a memory control circuit unit according to an exemplary embodiment of the invention.

FIG. 5 is a simple block diagram illustrating a memory control circuit unit according to an exemplary embodiment of the invention.

With reference to FIG. 5, the memory control circuit unit 404 includes a memory management circuit 502, a host interface 504, and a memory interface 506.

The memory management circuit 502 is configured to control the overall operation of the memory control circuit unit 404. Particularly, the memory management circuit 502 has a plurality of control commands; if the memory storage device 10 is in operation, the control commands are executed to perform operations, such as data writing, reading, and erasing. The operations of the memory management circuit 502 are described below; in case that the operations of the memory management circuit 502 are similar to those of the memory control circuit unit 404, the relevant descriptions will be omitted.

In the present exemplary embodiment, the control commands of the memory management circuit 502 are implemented in a firmware form. For instance, the memory management circuit 502 has a microprocessor unit (not shown) and a read-only memory (ROM, not shown), and these control commands are programmed into the ROM. If the memory storage device 10 is in operation, the control commands are executed by the microprocessor unit to perform operations such as writing, reading, and erasing data.

In another exemplary embodiment of the invention, the control commands of the memory management circuit 502 are stored in a specific area of the rewritable non-volatile memory module 406 (for instance, a system area of the memory module exclusively used for storing system data) as program codes. Additionally, the memory management circuit 502 has a microprocessor unit (not shown), a ROM (not shown), and a RAM (not shown). In particular, the ROM has boot codes, and if the memory control circuit unit 404 is enabled, the microprocessor unit first executes the boot codes to load the control instructions from the rewritable non-volatile memory module 406 into the RAM of the memory management circuit 502. The microprocessor unit then runs the control commands to write, read, and erase data.

The host interface 504 is coupled to the memory management circuit 502 and is configured to couple to the connection interface unit 402, so as to receive and identify commands and data transmitted by the host system 11. Namely, the commands and data are transmitted from the host system 11 to the memory management circuit 502 through the host interface 504. In the present exemplary embodiment, the host interface 504 complies with the SATA standard. However, the invention is not limited thereto, and the host interface 504 may also comply with the PATA standard, the IEEE 1394 standard, the PCI express standard, the USB standard, the UHS-I interface standard, the UHS-II interface standard, the SD standard, the MS standard, the MMC standard, the CF standard, the IDE standard, or any other appropriate data transmission standard.

The memory interface 506 is coupled to the memory management circuit 502 and configured to access the rewritable non-volatile memory module 406 and the smart card 408. Namely, data to be written into the rewritable non-volatile memory module 406 or into the smart card 408 may be converted by the memory interface 506 into a format acceptable to the rewritable non-volatile memory module 406 or the smart card 408. For instance, if the memory management circuit 502 is about to access the rewritable non-volatile memory module 406, the memory interface 506 transmits a corresponding command sequence. The corresponding command sequences may include one or more signals or data on the bus. For instance, a reading command sequence may include reading identification codes, memory addresses, and so forth.

In an exemplary embodiment of the invention, the memory control circuit unit 404 further includes a buffer memory 508, a power management circuit 510, and an error checking and correcting (ECC) circuit 512.

The buffer memory 508 is coupled to the memory management circuit 502 and configured to temporarily store data and commands received from the host system 11 or data received from the rewritable non-volatile memory module 406 or the smart card 408.

The power management circuit 510 is coupled to the memory management circuit 502 and configured to control the power supply of the memory storage device 10.

The ECC circuit 512 is coupled to the memory management circuit 502 and configured to perform an ECC procedure to ensure data accuracy. To be specific, if the memory management circuit 502 receives a writing command from the host system 11, the ECC circuit 512 generates an ECC code and/or an error detecting code (EDC) for data corresponding to the writing command, and the memory management circuit 502 writes the data, the corresponding ECC code, and/or the corresponding EDC into the rewritable non-volatile memory module 406. Subsequently, if the memory management circuit 502 reads the data from the rewritable non-volatile memory module 406, the memory management circuit 502 also reads the ECC code and/or the EDC corresponding to the data, and the ECC circuit 512 executes the ECC procedure on the data according to the ECC code and/or the EDC.

Figure 6:
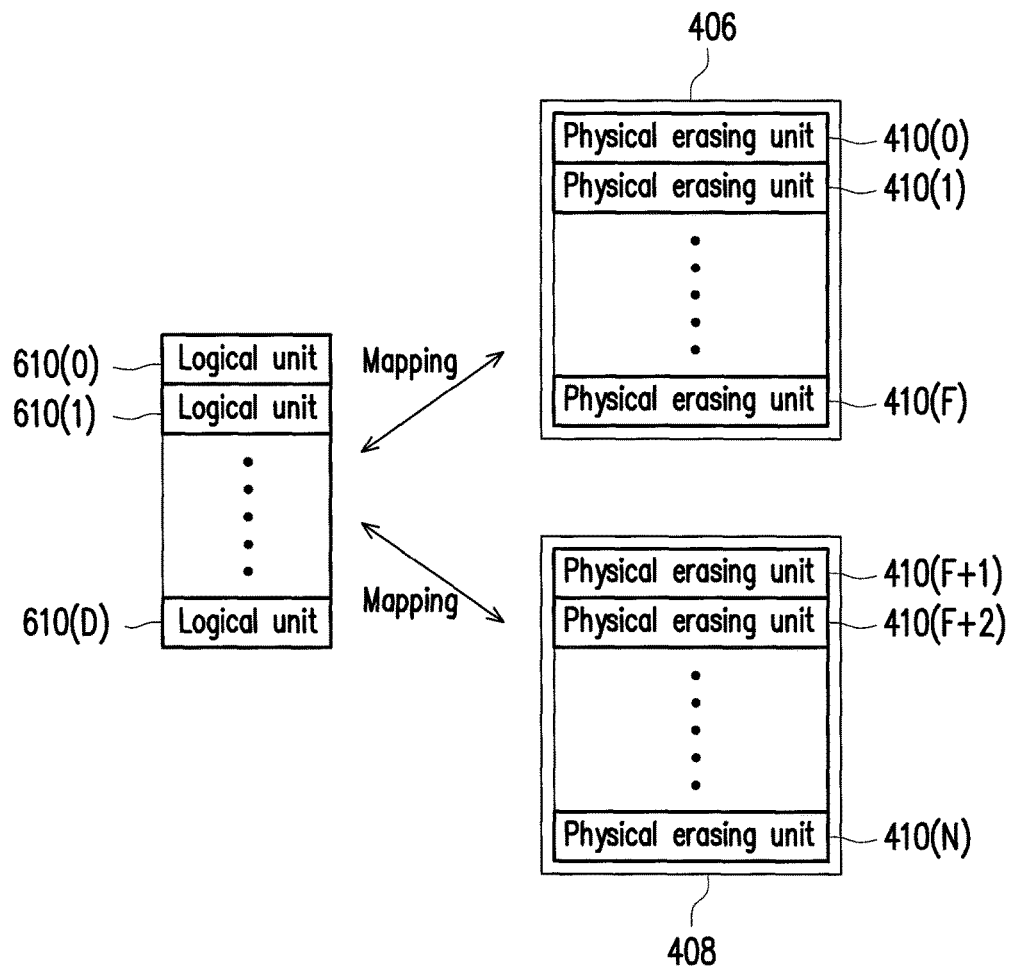
FIG. 6 is a schematic diagram illustrating an example of managing physical erasing units according to an exemplary embodiment of the invention.

FIG. 6 is a schematic diagram illustrating an example of managing physical erasing units according to an exemplary embodiment of the invention.

It should be understood that the terms used herein for describing the operations (such as "select," "group," "divide," and "associate") performed on the physical erasing units refer to logical operations performed on these physical erasing units. Namely, the physical erasing units in the rewritable non-volatile memory module 406 and in the smart card 408 are merely logically operated, and the actual positions of the physical erasing units in the rewritable non-volatile memory module 406 and the smart card 408 remain unchanged.

With reference to FIG. 6, the rewritable non-volatile memory module 406 has a plurality of physical erasing units 410(1) to 410(F), and the smart card 408 has a plurality of physical erasing units 410(F+1) to 410(N). The physical erasing units 410(0) to 410(F) may belong to the same memory die or belong to different memory dies. The physical erasing units 410(F+1) to 410(N) may also belong to the same memory die or belong to different memory dies. Each physical erasing unit has a plurality of physical programming units, and the physical programming units belonging to the same physical erasing unit may be written independently and erased simultaneously.

According to the present exemplary embodiment, the physical programming unit is the smallest unit for programming; that is, each of the physical programming units is the smallest unit for writing data. The physical programming units are physical pages or physical sectors, for instance. In case that the physical programming units are the physical pages, each of the physical programming units may include a data bit region and a redundant bit region. The data bit region includes a plurality of physical sectors for storing user data, and the redundant bit region is configured for storing system data (e.g., ECC codes). In the present exemplary embodiment, each data bit region contains 32 physical sectors, and the size of each physical sector is 512 bytes (512B). However, in other exemplary embodiments, 8, 16, or more or less number of the physical sectors may be included in the data bit region. In another aspect, the physical erasing unit is the smallest unit for erasing data. Namely, each of the physical erasing units contains the least number of memory cells that are erased all together. The physical erasing units are physical blocks, for instance. Besides, in another exemplary embodiment, the smart card 408 may also include other types of storage media and may not store data by using the physical erasing units.

The memory management circuit 502 configures logical units 610(0)-610(D) to map to at least parts of the physical erasing units 410(0)-410(N). For instance, in the present exemplary embodiment, the host system 11 accesses the data stored in the physical erasing units 410(0)-410(N) through logical block addresses (LBA); therefore, each of the logical units 610(0)-610(D) stands for one LBA. In another exemplary embodiment, the capacity of one logical unit is equal to the capacity of one logical sector. For instance, the capacity of one logical sector is 512 kilobytes (KB). However, in another exemplary embodiment, the capacity of one logical unit may be greater or less than that provided herein, and each of the logical units 610(0)-610(D) may stand for one logical programming unit, one logical erasing unit, or plural consecutive LBAs. Each of the logical units 610(0)-610(D) maps to one or more physical units. In the present exemplary embodiment, each physical unit stands for one physical sector. However, in another exemplary embodiment, one physical unit may refer to one physical address, one physical programming unit, one physical erasing unit, or plural consecutive physical addresses, which should not be construed as limitations to the invention. The memory management circuit 502 is able to record the mapping relationship between the logical units and the physical units in one or more logical-physical mapping tables. If the host system 11 intends to read data from or write data into the memory storage device 10, the memory management circuit 502 may perform data access in the memory storage device 10 according to the one or more logical-physical mapping tables.

In the present exemplary embodiment, the host system 11 executes an application program 410. The host system 11 (or the application program 410) is capable of accessing the smart card 408. For instance, the application program 410 may include and may not be limited to an instant communication application program, a message application program, a phone application program, and a security verification application program. The host system 11 may also execute an operating system (OS) and execute the application program 410 with the OS. The OS is, for instance, android 4.4.2, OS of any other type or other versions.

In general, the host system 11 (or the application program 410) accesses the smart card 408 through one or more temporary files. For instance, if the smart card 408 is initialized, the smart card 408 is re-coupled to or inserted into the memory storage device 10, if the memory storage device 10 is re-booted, or if the memory storage device 10 needs to update information, such as a file name or a logical unit of a temporary file, the host system 11 (or the application program 410) dynamically opens one or more temporary files. The opened temporary files are associated with the smart card 408. In the file system of the host system 11, the file location and/or the access authentication of the dynamically opened temporary file (i.e., the dynamic temporary file) may be different from the file location and/or the access authentication of a static temporary file (i.e., a temporary file opened by the operating system with default operation). For instance, the file location of the dynamic temporary file may be in one default file directory/path belonging to the application program 410, and thus the dynamic temporary file may be accessed by the application program 410. By contrast, the file location of the static temporary file may be in a file directory/path that cannot be accessed by the application program 410, i.e. a root directory. Through accessing the logical unit belonging to the temporary file, the host system 11 (or the application program 410) may perform the data accessing operation of the smart card 408.

In the present exemplary embodiment, after dynamically opening a temporary file, the host system 11 transmits at least one setting command corresponding to the temporary file to the memory storage device 10, so as to set the temporary file. Particularly, the setting command is configured to set the logical units belonging to the temporary file. For instance, at least some of the logical units belonging to the temporary file are transmitted to the memory storage device 10 together with the transmission of the setting command. In the present exemplary embodiment, one setting command includes one or more setting messages. One setting message includes setting command verification information and location identification information. The setting command verification information is configured to verify whether the setting command including the setting command verification information is configured to set a specific temporary file. The location identification information is configured to find a logical unit corresponding to one of the setting messages including the location identification information. For illustrative purposes, in the following exemplary embodiments, the location identification information including ordinal position identification information serves as the aforesaid location identification information.

Figure 7:
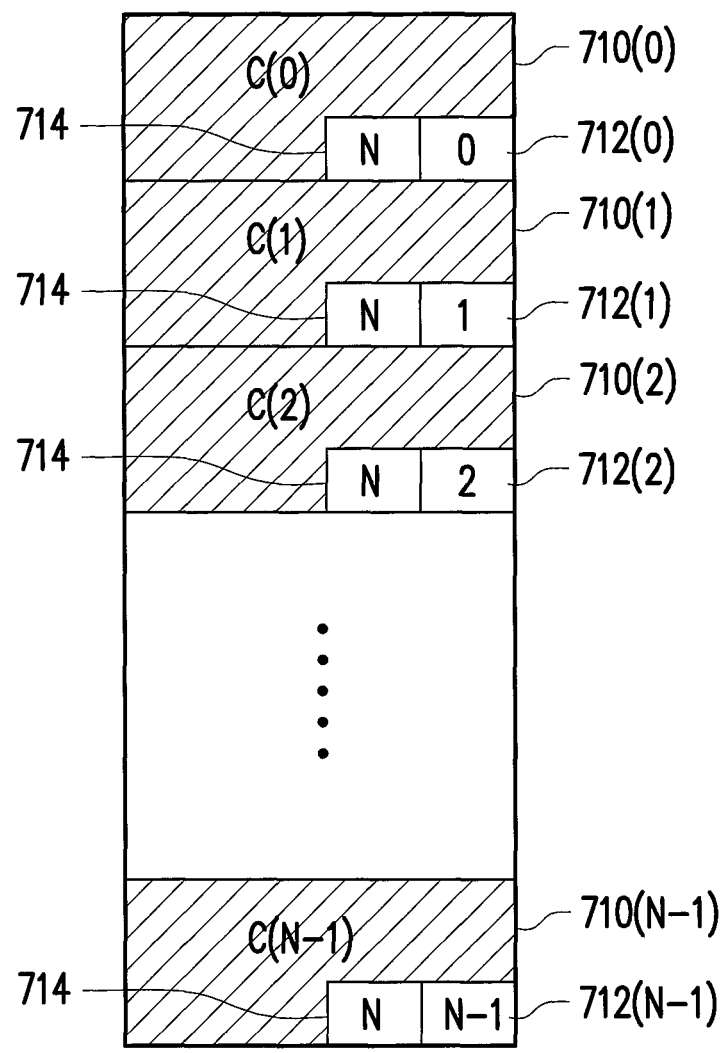
FIG. 7 is a schematic diagram illustrating a setting message according to an exemplary embodiment of the invention.

FIG. 7 is a schematic diagram illustrating a setting message according to an exemplary embodiment of the invention.

With reference to FIG. 7, it is assumed that the setting messages 710(0)-710(N−1) are configured to set the logical units belonging to one specific temporary file. Here, N is an integer and is equal to the number of the logical units belonging to the temporary file. The setting messages 710(0)-710(N−1) are included in one or more setting commands and are transmitted to the memory storage device 10. For instance, the setting message 710(0) includes setting command verification information C(0) and location identification information 712(0). The setting command verification information C(0) is configured to verify whether the setting command including the setting message 710(0) is configured to set a temporary file. The location identification information 712(0) is configured to find a logical unit corresponding to the setting message 710(0). In this exemplary embodiment, the location identification information 712(0) includes ordinal position identification information. The ordinal position identification information is configured to indicate an ordinal position of the setting message 710(0) in the setting messages 710(0)-710(N−1). For instance, the value of the ordinal position identification information of the location identification information 712(0) is "0", which indicates that the setting message 710(0) among the setting messages 710(0)-710(N−1) is arranged at the initial position. However, in another exemplary embodiment, the location identification information 712(0) may include logical unit identification information. The logical unit identification information may include the serial number of a logical unit corresponding to the setting message 710(0). Based on the logical unit identification information, the logical unit corresponding to the setting message 710(0) may be identified.

In another example, the setting message 710(1) includes setting command verification information C(1) and location identification information 712(1). The setting command verification information C(1) is configured to verify whether the setting command including the setting message 710(1) is configured to set a temporary file. The location identification information 712(1) is configured to find the logical unit corresponding to the setting message 710(1). In this exemplary embodiment, the location identification information 712(1) includes another ordinal position identification information. Said another ordinal position identification information is configured to indicate an ordinal position of the setting message 710(1) in the setting messages 710(0)-710(N−1). For instance, the value of the ordinal position identification information of the location identification information 712(1) is "1", which indicates that the setting message 710(1) among the setting messages 710(0)-710(N−1) is arranged at the second position following the position of the setting message 710(0). In light of the above, the setting message 710(K) includes setting command verification information C(K) and location identification information 712(K). The setting command verification information C(K) is configured to verify whether the setting command including the setting message 710(K) is configured to set one temporary file associated with the smart card 408. The location identification information 712(K) is configured to find the logical unit corresponding to the setting message 710(K). For instance, the position identification information 712(K) may indicate an ordinal position of the setting message 710(K) in the setting messages 710(0)-710(N−1). Here, K is an integer and is within a range from 0 to N−1.

In another exemplary embodiment, at least one of the setting messages may include useful information, e.g., the total number of the setting messages. The information of the total number of the setting messages indicates the total number of plural setting messages for setting the same temporary file. For instance, in the exemplary embodiment shown in FIG. 7, the information 714 of the total number of the setting messages is applied to indicate the total number (e.g., "N") of the setting messages 710(0)-710(N−1).

It should be mentioned that, in the exemplary embodiment shown in FIG. 7, the formats of the setting messages 710(0)-710(N−1) for setting the same temporary file are the same. However, in another exemplary embodiment, the formats of the setting messages 710(0)-710(N−1) may be different. For instance, only some of the setting messages 710(0)-710(N−1) include the setting command verification information C(K), only some of the setting messages 710(0)-710(N−1) include the location identification information 712(K), and/or only some of the setting messages 710(0)-710(N−1) include the information 714 of the total number of the setting messages 710(0)-710(N−1).

In the present exemplary embodiment, each setting message configured to set the same temporary file corresponds to one logical unit belonging to the temporary file. For instance, according to the exemplary embodiment shown in FIG. 7, given that N logical units belong to one temporary file, each of the setting messages 710(0)-710(N−1) sequentially corresponds to one of the N logical units. The setting message 710(K) corresponds to the K$^{th}$ logical unit of the N logical units, for instance. According to an exemplary embodiment shown in FIG. 7, if the capacity of one logical unit is 512 bytes, then the capacity of each of the setting messages 710(0)-710(N−1) is 512 bytes. Here, each of the setting command verification information C(0)-C(N−1) accounts for 504 bytes, each of the location identification information 712(0)-712(N−1) accounts for 4 bytes, and the information 714 of the total number of the setting messages 710(0)-710(N−1) accounts for 4 bytes as well. However, in another exemplary embodiment, one setting message may correspond to plural logical units, and the capacities of the setting messages, the setting command verification information, the position identification information, and the information of the total number of the setting messages may be greater or less than those provided above and may be determined according to actual requirements.

In the present exemplary embodiment, the memory management circuit 502 verifies a setting command according to the setting command verification information in the setting command and determines whether to record one or more consecutive or inconsecutive logic ranges (i.e., logical address ranges) corresponding to the setting command according to whether the setting command passes the verification. For instance, the memory management circuit 502 compares the received setting command verification information with a default setting command verification information pre-stored in the memory management circuit 502 and determines whether the compared information is consistent. Here, the memory management circuit 502 may respectively compare each of the received setting command verification information with the corresponding default setting command verification information, or the memory management circuit 502 may compare a combination of at least parts of the received setting command verification information with the corresponding default setting command verification information. If the received setting command verification information and the default setting command verification information are consistent, the corresponding setting command passes the verification, and therefore the memory management circuit 502 records the corresponding one or more non-overlapped logic ranges in a look-up table. Here, one logic range may be constituted by plural consecutive or inconsecutive logical units belonging to one temporary file. If the received setting command verification information and the default setting command verification information are inconsistent, the memory management circuit 502 does not execute said action of recording the logic ranges.

Figures 8A, 8B:
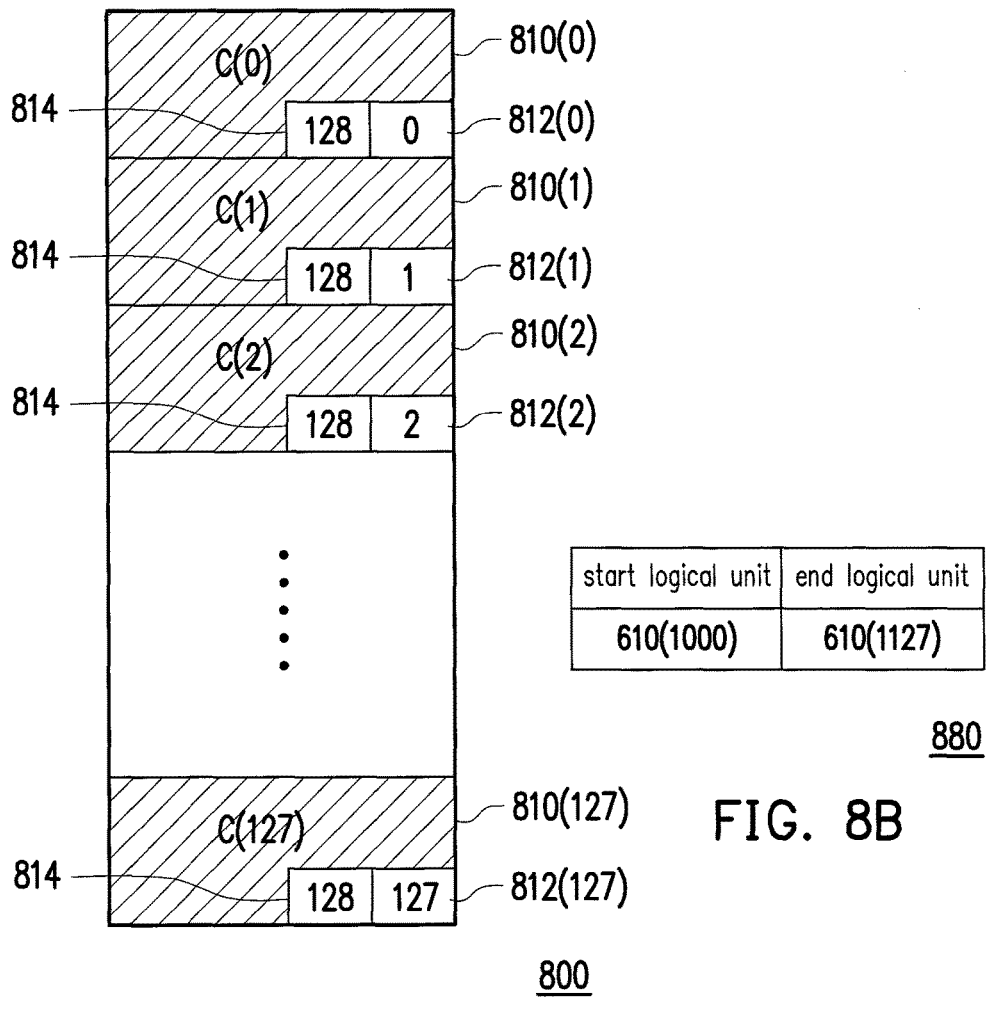
FIG. 8A and FIG. 8B are schematic diagrams illustrating an example of recording a logic range according to an exemplary embodiment of the invention.

FIG. 8A and FIG. 8B are schematic diagrams illustrating an example of recording a logic range according to an exemplary embodiment of the invention.

With reference to FIG. 8A and FIG. 8B, given that the capacity of one dynamic temporary file is 64 KB, the host system 11 generates and issues the setting command 800 for setting the dynamic temporary file to the memory storage device 10. The setting command 800 includes setting messages 810(0)-810(127). The total data length of the setting messages 810(0)-810(127) is equal to the data length of the dynamic temporary file. However, in another exemplary embodiment, the capacity of the temporary file may be larger or less than that described above, and the number of the setting messages 810(0)-810(127) may be more or less than that provided above. The invention is not limited thereto.

After the memory management circuit 502 receives the setting command 800, the memory management circuit 502 compares the setting command verification information C(0)-C(127) with default setting command verification information in the memory management circuit 502. If the setting command verification information C(0)-C(127) and the default setting command verification information are consistent, the memory management circuit 502 records a logic range corresponding to the setting command 800 in the look-up table 880. Here, a start logical unit, an end logical unit, or all of the logical units within the logic range are transmitted to the memory storage device 10 together with the transmission of the setting command 800. For instance, as shown in FIG. 8B, the start logical unit within the logic range is 610(1000), the end logical unit within the logic range is 610(1127), and the logic range includes the logical units 610(1000)-610(1127).

In an exemplary embodiment, if not all but some of the logical units (e.g., the start logical unit) are transmitted to the memory storage device 10 together with the transmission of the setting command 800, the memory management circuit 502 is able to obtain the size and/or boundaries of the logic range according to the information 814 of the total number of the setting messages in the setting command 800 or the location identification information 812(0) and 812(127). For instance, according to the information 814 of the total number of the setting messages in the setting command 800, the memory management circuit 502 may add "127" logical units to the received start logical unit 610(1000) to obtain the end logical unit 610(1127). In the present exemplary embodiment, within one logic range, only the start logical unit and the end logical unit are recorded, so as to save the storage space. However, in another exemplary embodiment, more or less logical unit within one logic range may be recorded. That is, at this time, the host system 11 already updates the logical units, belonging to one dynamic temporary file, in the memory storage device 10.

The logical units associated with the smart card 408 may be changed during the operation of the memory storage device 10, and therefore the steps of transmitting the setting command and recording the logic ranges belonging to a temporary file may be performed again if the logical units associated with the smart card 408 is required to be updated, e.g., if the smart card 408 is initialized, the smart card 408 is re-coupled to or inserted into the memory storage device 10, the memory storage device 10 is re-booted, the memory storage device 10 is being operated for more than a default time period, or at any time point.

In the previous exemplary embodiment, if the host system 11 or the application program 410 intends to update information of a temporary file, the host system 11 or the application program 410 may open a new temporary file. However, in an exemplary embodiment of the invention, before opening a new temporary file, the host system 11 or the application system 410 further determines whether the number of the existing dynamic temporary files (e.g., in a default directory that can be accessed by the application program 410) is sufficient. If the number of the existing dynamic temporary files is sufficient, the host system 11 or the application system 410 re-transmits the setting command corresponding to at least one of the existing dynamic temporary files to the memory storage device 10 instead of opening a new temporary file, so as to re-set the existing temporary files. On the contrary, if there is no dynamic temporary file which is already opened, or the number of the existing dynamic temporary files is insufficient, the host system 11 or the application system 410 then performs the step of dynamically opening the temporary file and transmitting the corresponding setting command.

After the memory management circuit 502 records the corresponding logic range in the look-up table according to one or more setting commands, the memory management circuit 502, if receiving an operating command from the host system 11, verifies the operating command and determines how to proceed further according to whether the operating command passes a verification. For instance, the memory management circuit 502 may verify the operating command according to default operating command verification information pre-stored in the memory storage device 10 and/or the logic range recorded in the look-up table. Here, the default operating command verification information may be the same as or different from the default setting command verification information described above, and the invention is not limited thereto. For instance, the memory management circuit 502 may compare the default operating command verification information with operating command verification information in the received operating command. If the default operating command verification information is inconsistent with the operating command verification information in the received operating command, the memory management circuit 502 may determine that the operating command fails to pass the verification and identify the operating command as a command for operating the rewritable non-volatile memory module 406. If the default operating command verification information is consistent with the operating command verification information in the received operating command, the memory management circuit 502 may determine that the operating command passes the verification and indicates to perform an access action on the smart card 408. In another exemplary embodiment, if the default operating command verification information is consistent with the operating command verification information in the received operating command, the memory management circuit 502 may further determine whether a logical unit indicated to be accessed by the operating command is included in any logic range recorded in the look-up table. If the logical unit indicated to be accessed by the operating command is included in one logic range recorded in the look-up table, the memory management circuit 502 determines the operating command passes the verification and indicates to perform a corresponding access action. For instance, in the exemplary embodiment shown in FIG. 8B, if one operating command passes the verification and the operating command indicates to access the logical unit 610(1000), the memory management circuit 502 identifies the operating command as including a communication data unit of the smart card 408 and indicates to perform an access action on the smart card 408 according to the operating command. According to the present exemplary embodiment, the communication data unit is a command-application protocol data unit (C-APDU) complying with the ISO 7816 standard. In addition, if the default operating command verification information is consistent with the operating command verification information in the received operating command, whereas the logical unit indicated to be accessed by the operating command is not included in any logic range recorded in the look-up table, it indicates that the mapping relationship between the smart card 408 and a logical unit belonging to a temporary file may have been changed, and thus the memory management circuit 502 determines that the operating command fails to pass the verification and thus does not indicate to perform any access action on the smart card 408, so as to prevent erroneous operation. In another exemplary embodiment, after receiving a certain operating command, the memory management circuit 502 may also omit the step of comparing the default operating command verification information with the operating command verification information in the received operating command; instead, the memory management circuit 502 may directly determine whether the logical unit indicated to be accessed by the operating command is included in any logic range recorded in the look-up table. If the logical unit indicated to be accessed by the operating command is included in one logic range recorded in the look-up table, the memory management circuit 502 determines the operating command passes the verification and indicates to perform an access action on the smart card 408 according to the operating command.

Figure 9:
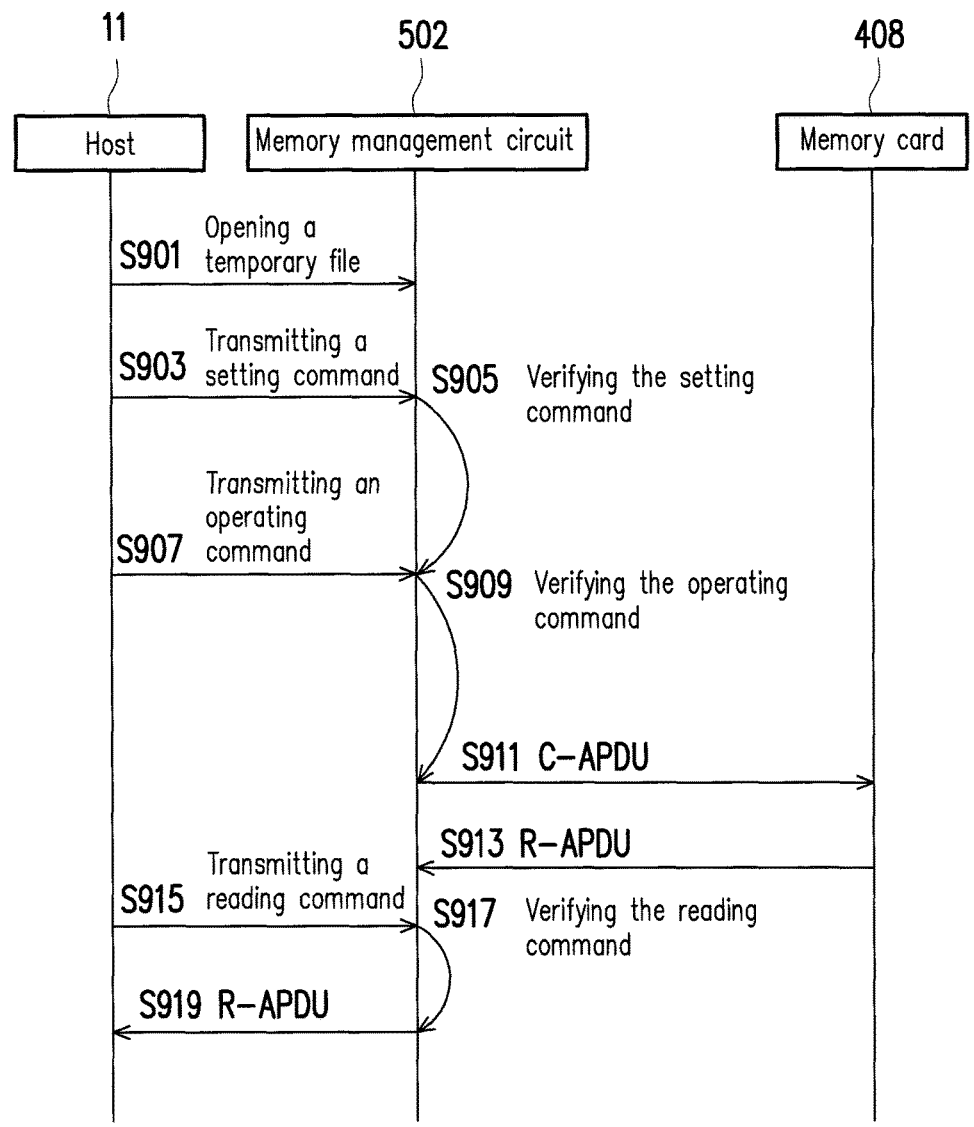
FIG. 9 is a flow chart illustrating a smart card management method according to an exemplary embodiment of the invention.

FIG. 9 is a flow chart illustrating a smart card management method according to an exemplary embodiment of the invention.

With reference to FIG. 9, in step S901, the host system 11 (or the application program 410) dynamically opens a temporary file for accessing the smart card 408.

In step S903, the host system 11 transmits a setting command corresponding to the temporary file to the memory storage device 10.

In step S905, the memory management circuit 502 verifies the setting command. The way to verify the setting command is already described in the previous embodiments and thus will not be further explained hereinafter. If the setting command passes the verification, the memory management circuit 502 records one or more logic ranges belonging to the temporary file in a look-up table according to the setting command.

In step S907, the host system 11 transmits an operating command corresponding to the smart card 408 to the memory storage device 10.

In step S909, the memory management circuit 502 receives the operating command from the host system 11 and verifies the operating command. The way to verify the operating command is already described in the previous embodiments and thus will not be further explained hereinafter.

If the operating command passes the verification, in step S911, the memory management circuit 502 identifies the operating command as the C-APDU of the smart card 408 and transmits the corresponding C-APDU operating command to the smart card 408. After transmitting the C-APDU operating command to the smart card 408, the memory management circuit 502 is in an "in-progress state", indicating that the memory management circuit 502 is waiting for a response from the smart card 408.

After the C-APDU operating command is completed, in step S913, the smart card 408 transmits a response in response to the received C-APDU operating command. According to an exemplary embodiment of the invention, the response is a response-application protocol data unit (R-APDU) complying with the ISO 7816 standard. After receiving the response, the memory management circuit 502 is in a "data available" state. That means the memory management circuit 502 is waiting for the host system 11 to read the response.

In step S915, the host system 11 or the application program 410 issues a reading command corresponding to one certain temporary file to the memory storage device 502, so as to read the response.

In step S917, the memory management circuit 502 verifies the reading command. For instance, the reading command may go through the identical or similar verification process performed on said operating command. If the reading command passes the verification, the memory management circuit 502 provides the response to the host system 11 in step S919.

It should be mentioned that, in the host system 11 of an exemplary embodiment of the invention, a cluster is referred as a basic access unit of data. Each cluster is constructed with $2^n$ logical sectors. For instance, one cluster is constructed by 64 continuous logical sectors, i.e., the capacity of the cluster is 32 KB. According to this exemplary embodiment, if the capacity of one temporary file exceeds one basic access unit, the setting messages configured to set the temporary file may be categorized into plural setting commands for data transmission. However, in another exemplary embodiment, the capacity of one cluster may be greater or less than that described above, and the invention should not be limited thereto.

Figures 10A, 10B:
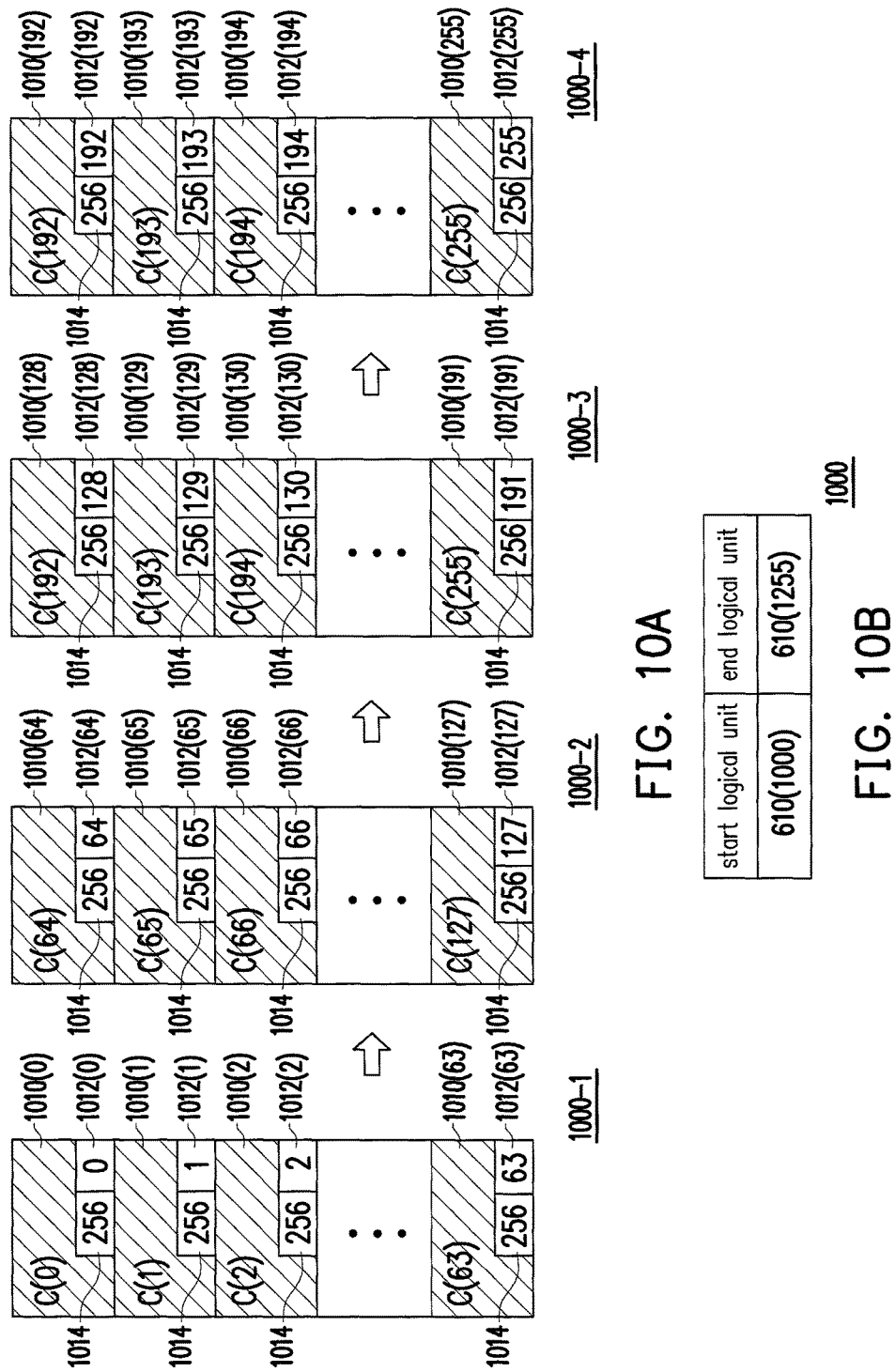
FIG. 10A and FIG. 10B are schematic diagrams illustrating an example of recording logic ranges according to another exemplary embodiment of the invention.

FIG. 10A and FIG. 10B are schematic diagrams illustrating an example of recording logic ranges according to another exemplary embodiment of the invention.

With reference to FIGS. 10A and 10B, it is assumed that the setting messages 1010(0)-1010(255) are configured to set a specific temporary file. Besides, if a 32 KB cluster is referred as a basic access unit, and the capacity of the temporary file is 128 KB, then the setting messages 1010(0)-1010(255) may be categorized into four setting commands 1000-1 to 1000-4 for data communication. Here, the capacity of each of the setting commands 1000-1 to 1000-4 is equal to the capacity of one basic access unit. Note that the capacity of one basic access unit and the number of the setting commands for setting the same temporary file are not limited herein. For instance, in another exemplary embodiment, if one basic access unit is 16 KB, the host system 11 may issue 8 or more setting commands for transmitting the setting messages 1010(0)-1010(255).

As shown in FIG. 10A, the setting command 1000-1 includes setting messages 1010(0)-1010(63); the setting command 1000-2 includes setting messages 1010(64)-1010(127); the setting command 1000-3 includes setting messages 1010(128)-1010(191); the setting command 1000-4 includes setting messages 1010(192)-1010(255). The format of each of the setting messages 1010(0)-1010(255) is similar to or identical to the format of the setting messages described in the embodiment shown in FIG. 7. For instance, the setting message 1010(K) may include at least one of setting command verification information C(K), location identification information 1012(K), and the information 1014 of the total number of the setting messages. The setting command verification information C(K) serves to verify whether the setting command 1000-1 including the setting message 1000-1 is configured to set a temporary file. The location identification information 1012(K) serves to find a logical unit corresponding to the setting message 1010(K). In this exemplary embodiment, the location identification information 1012(K) includes ordinal position identification information. The ordinal position identification information is configured to indicate an ordinal position of the setting message 1010(K) among the setting messages 1010(0)-1010(255). The information 1014 of the total number of the setting messages indicates the total number (e.g., 256) of plural setting messages 1010(0)-1010(255) for setting the same temporary file. Here, K is an integer and is within a range from 0 to 255.

The memory management circuit 502 may sequentially receive and verify the setting commands 1000-1 to 1000-4. For instance, as to the setting command 1000-1, the memory management circuit 502 compares the setting command verification information C(0)-C(63) and corresponding default setting command verification information; as to the setting command 1000-2, the memory management circuit 502 compares the setting command verification information C(64)-C(127) and another corresponding default setting command verification information; the rest can be deduced from the above. The way to verify the setting command is already described in the previous embodiments and thus will not be further explained hereinafter.

If the setting commands 1000-1 to 1000-4 all pass the verification, the memory management circuit 502 determines one or more corresponding logic ranges according to the setting commands 1000-1 to 1000-4. For instance, according to the location identification information 1012(0)-1012(63) and a start logical unit 610(1000) transmitted together with the transmission of the setting command 1000-1, the memory management circuit 502 may obtain the logic ranges 610(1000)-610(1063); according to the location identification information 1012(64)-1012(127) and a start logical unit 610(1064) transmitted together with the transmission of the setting command 1000-2, the memory management circuit 502 may obtain the logic ranges 610(1064)-610(1127); according to the location identification information 1012(128)-1012(191) and a start logical unit 610(1128) transmitted together with the transmission of the setting command 1000-3, the memory management circuit 502 may obtain the logic ranges 610(1128)-610(1191); according to the location identification information 1012(192)-1012(255) and a start logical unit 610(1192) transmitted together with the transmission of the setting command 1000-4, the memory management circuit 502 may obtain the logic ranges 610(1192)-610(1255). Here, the memory management circuit 502 adds the start logical unit corresponding to one certain setting command to the total number of the setting messages in the setting command, so as to obtain corresponding logic range. For instance, 63 logical units may be added to the start logical unit 610(1000) transmitted together with the transmission of the setting command 1000-1, so as to obtain the logic range 610(1000)-610(1063) corresponding to the setting command 1000-1.

The memory management circuit 502 records the obtained logic ranges in the look-up table 1000. Since the obtained logic ranges are consecutive, the logic ranges may be combined as 610(1000)-610(1255), and the start logical unit 610(1000) and the end logical unit 610(1255) may be recorded in the look-up table 1000. That is, at this time, the logical unit, belonging to the same dynamic temporary file, is already set in the memory storage device 10.

Note that the consecutive logical units belonging to the same temporary file are recorded in the previous exemplary embodiments. However, in another exemplary embodiment, the logical units belonging to the same temporary file may be inconsecutive.

Figures 11A, 11B:
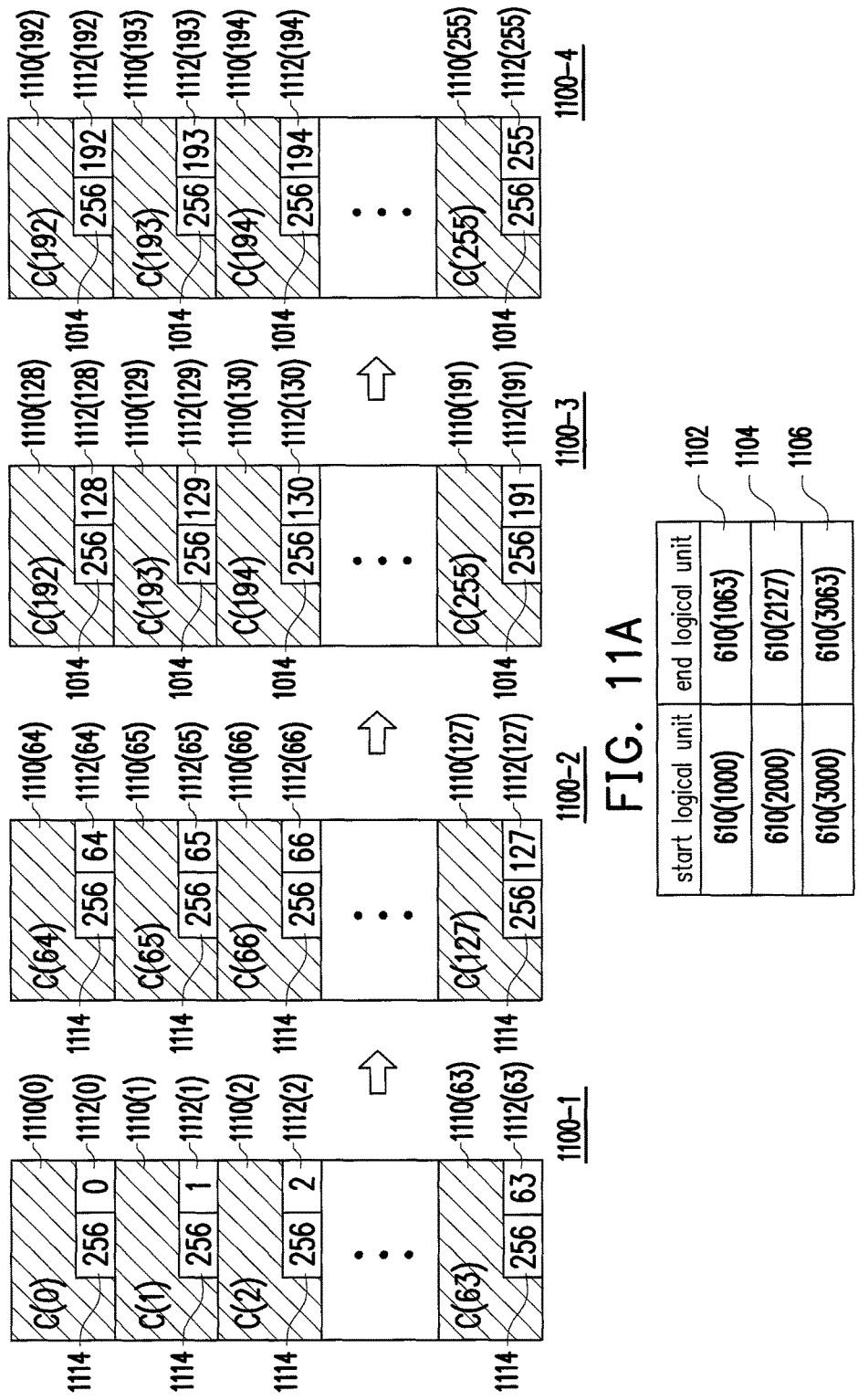
FIG. 11A and FIG. 11B are schematic diagrams illustrating an example of recording inconsecutive logic ranges according to another exemplary embodiment of the invention.

FIG. 11A and FIG. 11B are schematic diagrams illustrating an example of recording inconsecutive logic ranges according to another exemplary embodiment of the invention.

With reference to FIG. 11A and FIG. 11B, the difference in the exemplary embodiment shown herein and the exemplary embodiment shown in FIG. 10 lies in that the logical units belonging to the to-be-set dynamic temporary file are inconsecutive. For instance, the logical units belonging to the dynamic temporary file described herein are logical units 610(1000)-610(1063), 610(2000)-610(2127), and 610(3000)-610(3063). Here, the start logical unit 610(1000) is transmitted to the memory storage device 10 together with the transmission of the setting command 1100-1, the start logical unit 610(2000) is transmitted to the memory storage device 10 together with the transmission of the setting command 1100-2, the start logical unit 610(2064) is transmitted to the memory storage device 10 together with the transmission of the setting command 1100-3, and the start logical unit 610(3000) is transmitted to the memory storage device 10 together with the transmission of the setting command 1100-4.

After receiving the setting commands 1100-1 to 1100-4, if the setting commands 1100-1 to 1100-4 all pass the verification, the memory management circuit 502 obtains the logic ranges 610(1000)-610(1063) according to the start logical unit 610(1000) and the location identification information 1112(0)-1112(63) in the setting command 1100-1, obtains the logic ranges 610(2000)-610(2063) according to the start logical unit 610(2000) and the location identification information 1112(64)-1112(127) in the setting command 1100-2, obtains the logic ranges 610(2064)-610(2127) according to the start logical unit 610(2064) and the location identification information 1112(128)-1112(191) in the setting command 1100-3, and obtains the logic ranges 610(3000)-610(3063) according to the start logical unit 610(3000) and the location identification information 1112(192)-1112(255) in the setting command 1100-4. Here, the memory management circuit 502 adds the start logical unit corresponding to one certain setting command to the total number of the setting messages in the setting command, so as to obtain corresponding logic range. After the logic ranges that can be combined are combined, the memory management circuit 502 may record the inconsecutive logic ranges 1102, 1104, and 1106 in the look-up table 1100 (as shown in FIG. 11B). The inconsecutive logic ranges 1102, 1104, and 1106 belong to the same temporary file. Besides, the logic ranges belonging to other temporary files can also be recorded in the look-up table 1100 in a similar manner. After receiving an operating command from the host system 11, the memory management circuit 502 may perform the corresponding verification process and determine whether the operating command is configured for operating the smart card 408 according to the look-up table 1100.

Figure 12:
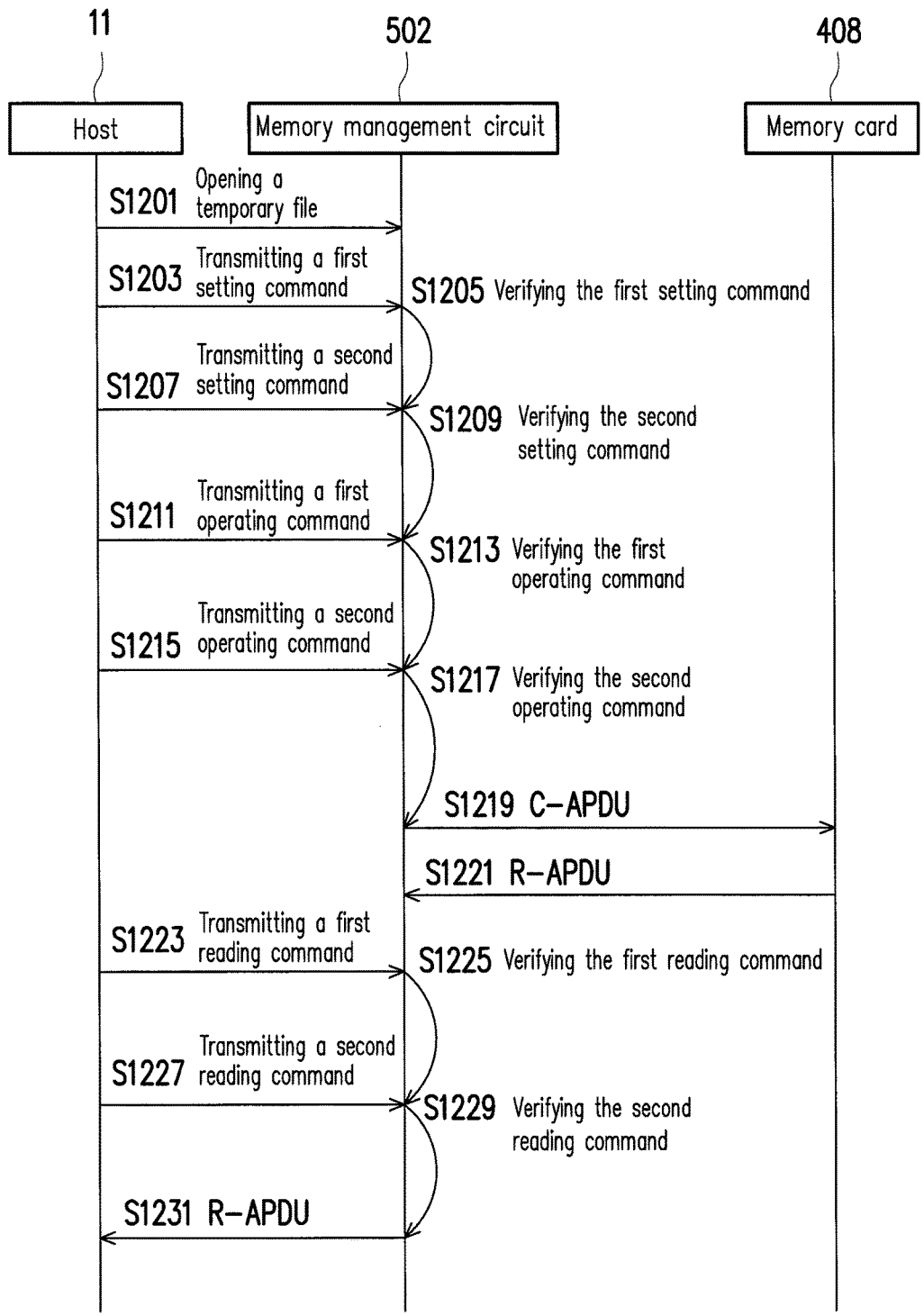
FIG. 12 is a flow chart illustrating a smart card management method according to another exemplary embodiment of the invention.

FIG. 12 is a flow chart illustrating a smart card management method according to another exemplary embodiment of the invention.

With reference to FIG. 12, in step S1201, the host system 11 (or the application program 410) dynamically opens a temporary file for accessing the smart card 408. Here, the setting message configured to set the temporary file is assumed to be divided into two setting commands for data transmission.

In step S1203, the host system 11 transmits one of the setting commands (i.e., the first setting command) corresponding to the temporary file to the memory storage device 10.

In step S1205, the memory management circuit 502 verifies the first setting command. The way to verify the setting command is already described in the previous embodiments and thus will not be further explained hereinafter. If the first setting command passes the verification, the memory management circuit 502 records a logic range belonging to the temporary file in a look-up table according to the first setting command.

In step S1207, the host system 11 transmits another one of the setting commands (i.e., the second setting command) corresponding to the temporary file to the memory storage device 10.

In step S1209, the memory management circuit 502 verifies the second setting command. The way to verify the setting command is already described in the previous embodiments and thus will not be further explained hereinafter. If the second setting command passes the verification, the memory management circuit 502 records another logic range belonging to the same temporary file in the look-up table according to the second setting command.

In step S1211, the host system 11 transmits an operating command (i.e., the first operating command) corresponding to the smart card 408 to the memory storage device 10.

In step S1213, the memory management circuit 502 receives the first operating command from the host system 11 and verifies the first operating command. The way to verify the operating command is already described in the previous embodiments and thus will not be further explained hereinafter.

In step S1215, the host system 11 transmits another operating command (i.e., the second operating command) corresponding to the smart card 408 to the memory storage device 10.

In step S1217, the memory management circuit 502 receives the second operating command from the host system 11 and verifies the second operating command. The way to verify the operating command is already described in the previous embodiments and thus will not be further explained hereinafter.

If both the first operating command and the second operating command pass the verification, the memory management circuit 502 merges the two operating commands and identifies the merged operating commands as the C-APDU of the smart card 408. In step S1219, the memory management circuit 502 issues the corresponding C-APDU operating command to the smart card 408. After issuing the C-APDU operating command to the smart card 408, the memory management circuit 502 is in an "in-progress state", indicating that the memory management circuit 502 is waiting for the response from the smart card 408.

After the C-APDU operating command is completed, in step S1221, the smart card 408 transmits an R-APDU to the memory management circuit 502 in response to the received C-APDU operating command. After receiving the R-APDU, the memory management circuit 502 is in a "data available" state, indicating that the memory management circuit 502 is waiting for the host system 11 to read the R-APDU.

In step S1223, the host system 11 or the application program 410 issues a reading command (i.e., the first reading command) corresponding to one certain temporary file to the memory storage device 10, so as to read a part of the R-APDU.

In step S1225, the memory management circuit 502 may verify the first reading command.

In step S1227, the host system 11 or the application program 410 issues another reading command (i.e., the second reading command) corresponding to the same temporary file to the memory storage device 10, so as to read the other part of the R-APDU.

In step S1229, the memory management circuit 502 may verify the second reading command. For instance, the first reading command and the second reading command may go through the identical or similar verification process performed on said operating commands.

If the first reading command and the second reading command both pass the verification, the memory management circuit 502 provides the R-APDU to the host system 11 in step S1231.

It should be mentioned that the embodiments respectively shown in FIG. 9 and FIG. 12 may be referred as a data transmission system. The data transmission system is suitable for communication between a host system and a memory storage device having a smart card and a rewritable non-volatile memory module. Each step in FIG. 9 and FIG. 12 may be implemented on a software module or a hardware circuit.

To sum up, specific information is added to the setting command of the temporary file, such that the logical units belonging to the newly opened temporary file can be correctly recorded by the memory storage device, and recording errors arising from transmitting the setting commands in batch may be reduced.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A smart card management method configured to a flash memory storage device having a flash memory module and a smart card, the smart card management method comprising:

receiving a first setting command corresponding to a temporary file from a host system, wherein the temporary file is associated with the smart card, the first setting command comprises a plurality of first setting messages, and one of the first setting messages comprises first setting command verification information and first location identification information, wherein the first setting command verification information is configured to verify whether the first setting command is configured to set the temporary file, and the first location identification information is configured to find a logical unit corresponding to the one of the first setting messages, wherein the first location identification information comprises ordinal position identification information configured to indicate an ordinal position of the one of the first setting messages in the first setting messages;

obtaining the first setting command verification information from the first setting command and determining whether the first setting command verification information conforms to a default setting command verification information;

obtaining logical units corresponding the first setting messages, and recording a first logic range belonging to the temporary file in a look-up table according to the logical units corresponding to the first setting messages if the first setting command verification information conforms to a default setting command verification information;

receiving an operating command from the host system;

determining whether logical units accessed by the operation command are within the first logic range recorded in the look-up table; and performing a data accessing operation of the smart card according the operating command if the logical units accessed by the operation command are within the first logic range.

2. The smart card management method of claim 1, further comprising:

receiving a second setting command corresponding to the temporary file from the host system, wherein the second setting command comprises a plurality of second setting messages; and recording a second logic range belonging to the temporary file in the look-up table according to the second setting command, wherein the first logic range and the second logic range are not overlapped with each other.

3. The smart card management method of claim 2, wherein a total of a first data length of the first setting messages and a second data length of the second setting messages is less than or equal to a data length of the temporary file.

4. The smart card management method of claim 2, wherein an end logical unit of the first logic range and a start logical unit of the second logic range are inconsecutive.

5. The smart card management method of claim 1, wherein another one of the first setting messages comprises second setting command verification information and second location identification information, and the smart card management method further comprises:

determining whether the first setting command verification information and the second setting command verification information conform to a default setting command verification information.

6. The smart card management method of claim 5, further comprising:

determining the first logic range according to the first location identification information and the second location identification information.

7. The smart card management method of claim 1, wherein the operating command comprises a command-application protocol data unit.

8. A flash memory control circuit unit configured to control a flash memory storage device having a flash memory module and a smart card, the flash memory control circuit unit comprising:

a host interface configured to couple to a host system;

a memory interface configured to couple to the rewritable non-volatile memory module; and a memory management circuit coupled to the host interface and the memory interface, wherein the memory management circuit is configured to receive a first setting command corresponding to a temporary file from the host system, wherein the temporary file is associated with the smart card, the first setting command comprises a plurality of first setting messages, and one of the first setting messages comprises first setting command verification information and first location identification information, wherein the first setting command verification information is configured to verify whether the first setting command is configured to set the temporary file, and the first location identification information is configured to find a logical unit corresponding to the one of the first setting messages, wherein the first location identification information comprises ordinal position identification information configured to indicate an ordinal position of the one of the first setting messages in the first setting messages, wherein the memory management circuit is further configured to obtain the first setting command verification information from the first setting command and determine whether the first setting command verification information conforms to a default setting command verification information, wherein the memory management circuit is further configured to obtain logical units corresponding the first setting messages and record a first logic range belonging to the temporary file in a look-up table according to the logical units corresponding to the first setting messages if the first setting command verification information conforms to a default setting command verification information, wherein the memory management circuit is further configured to receive an operating command from the host system, wherein the memory management circuit is further configured to determine whether logical units accessed by the operation command are within the first logic range recorded in the look-up table, and perform a data accessing operation of the smart card according the operating command if the logical units accessed by the operation command are within the first logic range.

9. The flash memory control circuit unit of claim 8, wherein the memory management circuit is further configured to receive a second setting command corresponding to the temporary file from the host system, and the second setting command comprises a plurality of second setting messages, wherein the memory management circuit is further configured to record a second logic range belonging to the temporary file in the look-up table according to the second setting command, and the first logic range and the second logic range are not overlapped with each other.

10. The flash memory control circuit unit of claim 9, wherein a total of a first data length of the first setting messages and a second data length of the second setting messages is less than or equal to a data length of the temporary file.

11. The flash memory control circuit unit of claim 9, wherein an end logical unit of the first logic range and a start logical unit of the second logic range are inconsecutive.

12. The flash memory control circuit unit of claim 8, wherein another one of the first setting messages comprises second setting command verification information and second location identification information, wherein the memory management circuit is further configured to determine whether the first setting command verification information and the second setting command verification information conform to a default setting command verification information.

13. The flash memory control circuit unit according to claim 12, wherein the memory management circuit is further configured to determine the first logic range according to the first location identification info nation and the second location identification information.

14. The flash memory control circuit unit of claim 8, wherein the operating command comprises a command-application protocol data unit.

15. A flash memory storage device comprising:
a connection interface unit configured to couple to a host system;
a rewritable non-volatile memory module;
a smart card; and
a flash memory control circuit unit coupled to the connection interface unit, the rewritable non-volatile memory module, and the smart card, wherein the flash memory control circuit unit is configured to receive a first setting command corresponding to a temporary file from the host system, wherein the temporary file is associated with the smart card, the first setting command comprises a plurality of first setting messages, and one of the first setting messages comprises first setting command verification information and first location identification information, wherein the first setting command verification information is configured to verify whether the first setting command is configured to set the temporary file, and the first location identification information is configured to find a logical unit corresponding to the one of the first setting messages, wherein the first location identification information comprises ordinal position identification information configured to indicate an ordinal position of the one of the first setting messages in the first setting messages, wherein the flash memory control circuit unit is further configured to obtain the first setting command verification information from the first setting command and determine whether the first setting command verification information conforms to a default setting command verification information, wherein the flash memory control circuit is further configured to obtain logical units corresponding the first setting messages, and record a first logic range belonging to the temporary file in a look-up table according to the logical units corresponding to the first setting messages if the first setting command verification information conforms to a default setting command verification information, wherein the flash memory control circuit unit is further configured to receive an operating command from the host system, wherein the flash memory control circuit is further configured to determine whether logical units accessed by the operation command are within the first logic range recorded in the look-up table, and perform a data accessing operation of the smart card according the operating command if the logical units accessed by the operation command are within the first logic range.

16. The flash memory storage device of claim 15, wherein the flash memory control circuit unit is further configured to receive a second setting command corresponding to the temporary file from the host system, and the second setting command comprises a plurality of second setting messages, wherein the flash memory control circuit unit is further configured to record a second logic range belonging to the temporary file in the look-up table according to the second setting command, wherein the first logic range and the second logic range are not overlapped with each other.

17. The flash memory storage device of claim 16, wherein a total of a first data length of the first setting messages and a second data length of the second setting messages is less than or equal to a data length of the temporary file.

18. The flash memory storage device of claim 16, wherein an end logical unit of the first logic range and a start logical unit of the second logic range are inconsecutive.

19. The flash memory storage device of claim 15, wherein another one of the first setting messages comprises second setting command verification information and second location identification information, wherein the flash memory control circuit unit is further configured to determine whether the first setting command verification information and the second setting command verification information conform to a default setting command verification information.

20. The flash memory storage device according to claim 19, wherein the flash memory control circuit unit is further configured to determine the first logic range according to the first location identification information and the second location identification information.

21. The memory storage device of claim 15, wherein the operating command comprises a command-application protocol data unit.

* * * * *